(12) United States Patent
Pedrazzoli et al.

(10) Patent No.: US 12,540,236 B2
(45) Date of Patent: Feb. 3, 2026

(54) ROOFING MEMBRANE COMPOSITIONS BASED ON A METALLOCENE-CATALYZED ALPHA-OLEFIN POLYETHYLENE

(71) Applicant: JOHNS MANVILLE, Denver, CO (US)

(72) Inventors: Diego Pedrazzoli, Littleton, CO (US); Lichih R Peng, Littleton, CO (US); Changqing Shen, Centennial, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 337 days.

(21) Appl. No.: 18/127,803

(22) Filed: Mar. 29, 2023

(65) Prior Publication Data
US 2024/0327628 A1 Oct. 3, 2024

(51) Int. Cl.
C08L 23/06 (2006.01)
E04D 5/06 (2006.01)
C08K 3/22 (2006.01)
C08K 3/26 (2006.01)

(52) U.S. Cl.
CPC .......... *C08L 23/06* (2013.01); *E04D 5/06* (2013.01); *C08K 2003/2241* (2013.01); *C08K 2003/265* (2013.01); *C08L 2205/02* (2013.01); *C08L 2207/066* (2013.01)

(58) Field of Classification Search
None
See application file for complete search history.

(56) References Cited

U.S. PATENT DOCUMENTS

| | | | |
|---|---|---|---|
| 5,108,831 A * | 4/1992 | Green | E04D 5/10 428/105 |
| 10,647,839 B2 | 5/2020 | Peng et al. | |
| 11,286,380 B2 | 3/2022 | Peng et al. | |
| 2018/0162109 A1* | 6/2018 | Gopalan | B32B 27/32 |
| 2019/0105883 A1* | 4/2019 | Gopalan | E04D 5/10 |
| 2021/0198465 A1* | 7/2021 | Gopalan | C08F 8/12 |

* cited by examiner

*Primary Examiner* — Babajide A Demuren
(74) *Attorney, Agent, or Firm* — Robert D. Touslee

(57) ABSTRACT

Provided is a roofing membrane composition comprising metallocene-catalyzed alpha-olefin polyethylene and a random polypropylene copolymer. The polymer blend is quite useful in a roofing membrane which exhibits excellent performance. The excellent performance is particularly evident in the mechanical properties and thermal properties of the roofing membrane.

28 Claims, 4 Drawing Sheets

ROOFING MEMBRANE COMPOSITIONS BASED ON A METALLOCENE-CATALYZED ALPHA-OLEFIN POLYETHYLENE

FIELD

Roofing membrane formulations are provided which are useful in roofing applications. The roofing membrane compositions are based on a metallocene-catalyzed alpha-olefin polyethylene.

BACKGROUND

Compositions and membranes comprising thermoplastic olefin (TPO) polymers have found widespread use in the roofing industry for commercial buildings. For roofing and other sheeting applications, the products are typically manufactured as membrane sheets. The sheets are typically sold, transported, and stored in rolls. For roofing membrane applications, several sheets are unrolled at the installation site, placed adjacent to each other with an overlapping edge to cover the roof and are sealed together by a heat welding process during installation. During transport and storage, the rolls can be exposed to extreme heat conditions, such as from 40° C. to 100° C., which can lead to roll blocking of the rolls during storage in a warehouse. After installation, the membranes can be exposed during service to a wide range of conditions that may deteriorate or destroy the integrity of the membrane. As such, a membrane is desired that can withstand a wide variety of service temperatures, with a particular focus on thermal stability and UV stability.

Thermoplastic olefin roofing membranes require high flexibility together with good mechanical stability at elevated temperatures, and high weathering resistance. A number of proposals for thermoplastic olefin films of this type are disclosed in the following publications.

US 2006/0046084 describes a thermoplastic polyolefin roofing membrane produced from a mixture of a polypropylene-based elastomer (PBE) and polyolefin copolymers.

US 2010/0255739 describes a roofing membrane with a composition comprising a propylene-based elastomer.

US 2010/0197844 describes a thermoplastic olefin membrane for use in construction materials which comprises a polypropylene-based elastomer.

PCT Publication WO 2010/0115079A1 is directed to roofing membranes that contain compositions comprising a propylene based elastomer and an impact propylene-ethylene copolymer. The propylene based elastomer was Vistamaxx™ 6102.

PCT Publication WO 2014/001224A1 is directed to compositions comprising 40 to 75 wt % of at least one polypropylene-based elastomer and around 25 to 60 wt % of at least one random copolymer of polypropylene. The polypropylene-based elastomers used in WO 2014/001224A1 were Vistamaxx™ 3980, 6102, and 6202.

PCT Publication WO 2014/040914A1 is directed to thermoplastic mixtures that comprise at least one impact-resistant polypropylene copolymer and at least one ethylene-1-octene copolymer, where the weight ratio of impact-resistant polypropylene copolymer to ethylene-1-octene copolymer is in the range of 35:65 to 65:35.

U.S. Pat. No. 10,414,140, is directed to a roofing membrane composition of a 10-50 wt % of a propylene-based elastomer, 5-40 wt % of a thermoplastic resin, at least one flame retardant, and at least one ultraviolet stabilizer.

U.S. Pat. No. 9,434,827 discloses a composition which is useful in roofing membranes that comprises on a polymer basis, from 40 to 75% by weight of at least one propylene based elastomer; and 25 to 60% by weight of at least one random polypropylene copolymer.

US 2021/0024733 describes a polymer blend that includes 35 to 50 wt % of at least one propylene-based elastomer, 25 to 50 wt % of at least one impact polymer and 15 to 25 wt % of at least one low-density polyethylene component. The polymer blend is useful for making a roofing membrane.

U.S. Pat. Nos. 10,619,037 and 10,647,839 both describe membrane compositions based on particular polymer blends. The polymer blends comprise from 30-60 wt % of a linear low-density polyethylene and from 20-65 wt % of a propylene polymer having from 10-60% crystallinity with rubber dispersed therein. From 5-20 wt % of the polymer blend is a combination of two compatibilizers. One is a polypropylene matrix copolymer and the other is a polyethylene matrix copolymer. See also, U.S. Pat. No. 11,286,380.

In traditional mixtures, an at least semicrystalline polyolefin material such as polyethylene or polypropylene, which provides the mechanical strength and resistance to temperature change, is mixed with a flexible blend component. This flexible blend component is miscible, or at least compatible, with the polyolefin. Flexible blend components used to date include, ethylene-propylene-diene rubber (EPDM), ethylene-n-alkene copolymers, and also polypropylene-based elastomers. At present, the most common TPO polymer used in roofing membranes is Hifax™ CA10A, which is a polypropylene random copolymer matrix with EP rubber well dispersed throughout the polypropylene phase. This TPO formulation relies on in-reactor blend resin that has only a minor polypropylene copolymer as the matrix phase and the EP rubber as the majority phase, which is well dispersed in the polypropylene. The rubber phase is so fine and uniformly distributed that it cannot be made by any conventional mechanical mixing. However, improvements, cost efficiency and reproducibility are still needed.

There still remains a need for roofing membranes that demonstrate flexibility at service temperatures, particularly elevated temperatures, as well as tensile and tear strengths. There is also a need for more economical roofing membranes which can meet such elevated temperature and strength requirements.

SUMMARY

A roofing membrane composition is provided comprising from 40 wt % to 70 wt % of a polymer blend composition consisting of from 50 to 80 wt % of a metallocene-catalyzed alpha-olefin polyethylene and from 20 to 50 wt % of a random polypropylene copolymer. The roofing membrane composition further comprises at least one flame retardant; at least one ultraviolet stabilizer; and at least one pigment. Such a composition has been found to provide an economical roofing membrane which meets the tensile strength, tear strength, and elevated temperature requirements now demanded in the industry. In one embodiment, the metallocene-catalyzed alpha-olefin polyethylene is a linear low-density polyethylene (LLDPE), and in another embodiment a very low-density polyethylene (VLDPE).

In one embodiment, the linear low or very low-density polyethylene comprises an octene comonomer. In one embodiment, the polypropylene polymer comprises a random polypropylene copolymer comprising less than 10 mol % ethylene monomer.

The foregoing polymer blends comprising a metallocene-catalyzed alpha-olefin polyethylene are useful in preparing a roofing membrane. The roofing membrane would be prepared from a membrane composition comprising the present polymer blend in an amount ranging from 40 to 70 wt % of the composition, and will generally include additives, e.g., at least one flame retardant, at least one ultraviolet stabilizer and at least one pigment.

Among other factors, it has been surprisingly discovered that combining a metallocene-catalyzed alpha-olefin polyethylene with the present random propylene polymer, and a package of roofing membrane additives, an economical TPO membrane with improved mechanical properties of tensile and tear, as well as high temperature thermal stability and UV stability can be obtained. This is particularly achieved using the present polymer blends, and this is achieved without modifying or changing the roofing membrane stabilizer package.

DETAILED DESCRIPTION

Figure 1A:
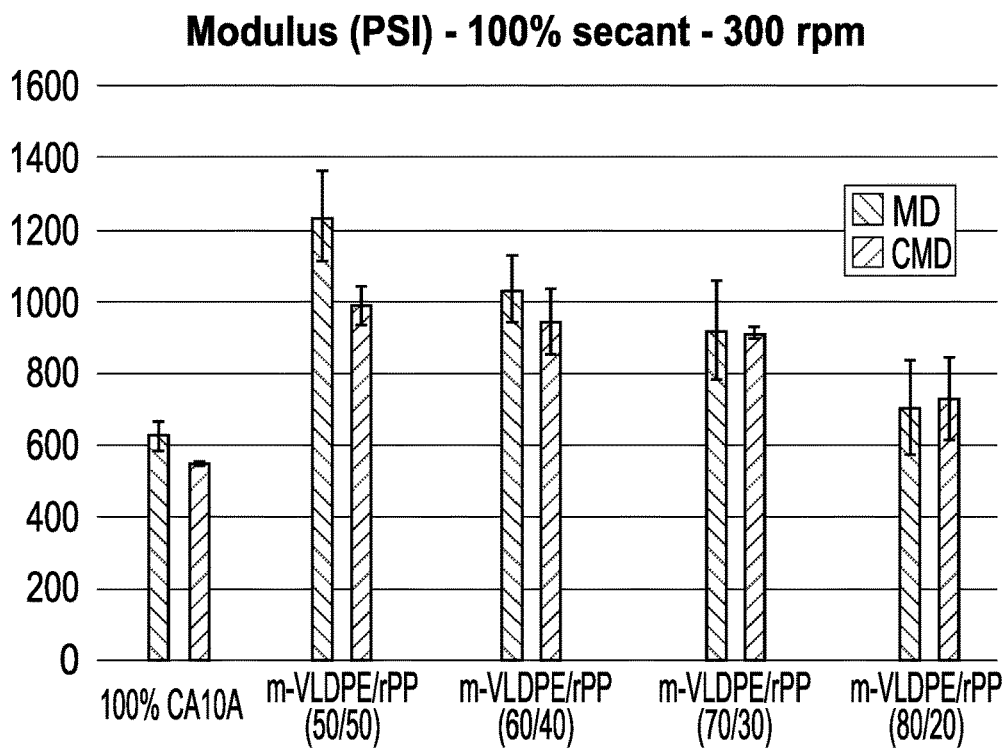
FIG. 1A graphically shows the tensile modulus (PSI) of different roofing formulations comprising a metallocene-catalyzed VLDPE/random polypropylene roofing formulation.

As the fastest growing commercial roofing membrane, TPO has become the dominant single ply membrane that provides both good weathering performance and lower cost. For the past decades, a TPO formulation heavily relies on an in-reactor blend resin that has minor polypropylene copolymer as the matrix phase and EP rubber as the majority phase well dispersed in the polypropylene. The rubber phase is so fine and uniformly distributed that it cannot be made by any conventional mechanical mixing. Due to this unique morphology, it gives good mechanical properties yet maintains the flexibility that is preferred by the roofers for installation convenience.

However, recent developmental work in polyolefin formulations have found that improved mechanical properties, including good strength and tear, can be achieved through a unique blend of polyolefin resins, which blend is also more economical. These blends not only can achieve good mechanical performance but also excellent weathering performance as tested by high temperature heating and aging.

The resin blend used in the roofing membrane composition comprises a metallocene-catalyzed alpha-olefin polyethylene. Among such polyethylenes, a LLDPE or VLDPE are preferred. A LLDPE with octene as its comonomer is particularly preferred. In addition, a polypropylene based polymer/copolymer is included. The polypropylene base polymer/copolymer provides mechanical strength and high temperature resistance, such as a random polypropylene. This polypropylene polymer replaces the in-reactor resin having EP rubber as a majority phase that is now typically used in roofing membranes. In one embodiment, the polymer blend consists of only the metallocene-catalyzed alpha-olefin polyethylene, for example a metallocene LLDPE or VLDPE, and a random polypropylene.

The present polymer blend allows one to achieve economical roofing membranes that exhibit excellent tensile and tear mechanical properties, as well as high temperature thermal stability as well as reduced tackiness. These advantages are unprecedented and offer the industry a solution to its quest for a more economical yet a better performing roofing membrane. These advantages have been discovered by combining a metallocene-catalyzed alpha-olefin polyethylene, such as a linear low-density polyethylene, with a random polypropylene copolymer. It has been found that the combination of the metallocene-catalyzed alpha-olefin polyethylene with the random polypropylene copolymer provides improved properties while still allowing for excellent phase stability. Maintaining phase stability is important, otherwise the physical properties and stability of the finished article are adversely affected. The present two component polymer blend has been found to insure phase stability, without changing or modifying the stabilizer package, and without the need for compatibilizers. The compatibilizers are often added to promote stability of a two-phase blend. The compatibilizers generally comprise a propylene/ethylene copolymer having a polymetric matrix, and/or an ethylene/propylene copolymer having a polyethylene matrix. Despite the absence of such compatibilizers a final product of excellent performance is achieved. The excellent performance is particularly evident in the mechanical properties, as well as thermal stability, and maintaining those properties over time.

In general, the preferred present polymer blend used in the present roofing membrane consists of only two components. The first is a metallocene-catalyzed alpha-olefin polyethylene. The preferred polyethylenes are a linear low-density polyethylene (LLDPE), and a very low-density polyethylene (VLDPE).

Metallocenes are very effective metal catalysts. They consist of minute particles of positively charged metal ions sandwiched between two cyclopentadienyl anions, which have five atoms per ring. They are also known as single-site catalysts because they have only one active site per catalyst particle, which are all identical. Metallocene catalysts were discovered in the 1950s. The metallocene catalysts are often combined with methylalumoxane [(MeAlo)$_n$] (MAO) which greatly enhances activity.

The metallocene catalyzed polymerization has many advantages over traditional polymerization techniques: it results in very pure, and consistent resins with well defined properties. Many derivatives of early metallocenes are active catalysts for olefin polymerization. Unlike traditional and still widely used heterogeneous Ziegler-Nata catalysts, metallocenes are homogeneous. The polymerization with metallocenes involves coordination of the monomer to the transition metal site before insertion at one end of the polymer chain. The coordination step is responsible for the versatility of these catalysts; since the arriving monomer needs to coordinate to the active site before propagation can occur, the electronic steric environment around it will control the polymerization and, thus, the polymer microstructure, the propagation and chain transfer rates, the comonomer reactivity ratios, and the stereo- and regio-selectivity. Metallocene LLDPE (m-LLDPE) generally has excellent impact and puncture resistance and gives heat seal benefits. These important properties make it suitable in high performance film applications, such as food and medical packaging.

It has been found that by employing metallocene catalyst alpha-olefin polymers in the roofing membrane composition, improved properties are realized for roofing membranes. Much larger amounts of the polymers can be employed to achieve improved mechanical properties and high temperature properties while avoiding the need for compatibilizers to insure phase stability. The polymers can be readily mixed with polypropylene polymers.

The production of the present LLDPE and VLDPE is initiated by metallocene-catalysts as discussed above. While LLDPE, VLDPE are prepared by copolymerization of ethylene and alpha-olefins, for the purposes of the present invention it is most preferred that the alpha-olefin comonomer is a butene, hexene or octene, alpha-olefin. It has been discovered that the best performance and processing characteristics are achieved when the LLDPE or VLDPE is prepared with octene as the comonomer.

In general, the LLDPE has a density of 0.910 to 0.925 g/cm$^3$, in another embodiment 0.915 to 0.920 g/cm$^3$, and in another embodiment, from 0.916 to 0.918 g/cm$^3$.

The VLDPE contains a higher comonomer content than LLDPE thus providing for lower density and crystallinity than most LLDPE products. The density of VLDPE is generally in the range of 0.885 to 0.910 g/cm$^3$.

The amount of metallocene-catalyzed alpha-olefin polymer used in the present polymer blend composition ranges from 50-80 wt %, and in another embodiment from 57-65 wt %, and in another embodiment from 59-61 wt % based on the weight of the polymer blend.

Examples of suitable and commercially available metallocene-catalyzed LLPE and VLDPE polymers are noted below in Table 1:

| | Supplier: | | | | | | |
|---|---|---|---|---|---|---|---|
| | LyondellBasell | Dow | Dow | Borealis | Mitsui | Ineos | Exxon |
| | | | | Resin Type: | | | |
| | LLDPE | VLDPE | LLDPE | VLDPE | VLDPE | VLOBE | LLDPE |
| | | | | Polymerization Catalyst: | | | |
| | Ziegler - Natta | Metallocene | Metallocene | Metallocene | Metallocene | Metallocene | Metallocene |
| | | | | Resin trade name: | | | |
| | Petrothene-GAS01020 | Affinity - PL-1880G | Innate - TH60 | Queo 0201 | Evolute - SP0510 | Eltex-PF0101KE | Exceed - XP7021-ML |
| Co-monomer type | C4 | C8 | C8 | C8 | C6 | C6 | C6 |
| Specific Gravity (g/cc) | 0.9318 | 0.902 | 0.912 | 0.902 | 0.904 | 0.903 | 0.911 |
| Melt Flow index (g/10 min) (190° C./2.18 kg) | 1.0 | 1.0 | 0.85 | 1.1 | 1.2 | 1.3 | 0.2 |
| Peak Melting Point (° C.) | 121 | 99 | 124 | 97 | 98 | 86-114 | 120-125 |
| Film Puncture Energy (in · lb/s) | | 78/8.6 | 92.9/10.5 | | | | 45/5.1 |
| Dart Impact Resistance (g) | 100 | >830 | 2100 | | | 1000 | 1100 |
| Tensile Strength at Break (MD/TD), MPa | 45/32 | 59/45 | 51.2/51.9 | 36 | 18 | 43/53 | 76/69 |
| Tensile Strength at Break (MD/TD), Ksi | 6.6/4.7 | 8.5/6.5 | 7.43/7.53 | 3.2 | 2.6 | 6.2/7.5 | 11/10 |
| Elongation at Break (MD/TD), % | 580/725 | 620/630 | 580/680 | 715 | >500 | 420/530 | 360/600 |
| Secant Modulus (MD/TD), 1% (ksi) | 27/28 | 13.9/13.4(*) | 21/24.5(*) | 9.4 | 16 | 11.6/11.6 | 3.7/23 |
| Seal Initiation Temperature (° C.) | | 80 | | 73 | | | |

(*)Second Modulus, 2%

Linear low-density polyethylene (LLDPE) is well known in the polymer industry and is readily available commercially. Linear low-density polyethylene is a substantially linear polymer (polyethylene), with significant numbers of short branches, commonly made by copolymerization of ethylene with longer-chain olefins. Linear low-density polyethylene differs structurally from conventional low-density polyethylene (LDPE) because of the absence of long chain branching. The linearity of LLDPE results from the different manufacturing processes of LLDPE and LDPE. In general, LLDPE is produced at lower temperatures and pressures by copolymerization of ethylene and such higher alpha-olefins as butene, hexene, or octene. The copolymerization process produces an LLDPE polymer that has a narrower molecular weight distribution than conventional LDPE and in combination with the linear structure, significantly different rheological properties.

The second component is a thermoplastic propylene polymer. In general, the propylene polymer is a thermoplastic propylene polymer, i.e., high tensile strength/low elongation/high melting point. Such resin components are well known. The propylene polymer can be a random copolymer, an impact polymer, or homopolymer. The random propylene polymer generally contains less than 10 mol % ethylene monomer and is preferred. The random polypropylene copolymer can comprise, for example, from 1 mol % to less than 10 mol % ethylene monomer.

Such polymers are well known. For example, polypropylene polymers are commercially available from Total Atofina. One such polymer is the random polypropylene polymer Total 7238. Others can be used. Another commercial propylene is available from ExxonMobil Chemical Company under the tradename ExxonMobile™PP. One specific product is ExxonMobil™PP7032.

The amount of the polypropylene copolymer component in the polymer blend can generally range from 20 to 50 wt %, and in another embodiment from 35-43 wt %, based on the weight of the blend. In one embodiment, the amount of random propylene polymer is about 40 wt %, e.g., 39-41 wt %. The propylene polymer component generally has a density that ranges from 0.87 to 0.92 g/cm$^3$, with a density in the range of from 0.88 to 0.91 in one embodiment. The melt flow rate of the propylene polymer component is generally in the range of from 0.5 to 20 g/10 min, and in one embodiment the melt flow ranges from 0.5 to 5.0 g/10 min. A melt flow rate in the range of from 0.6 to 4.0 g/10 min is exhibited in one embodiment. In one embodiment, the propylene polymer component is a random polypropylene copolymer containing less than 10 mol % ethylene monomer.

The present blend of polymers can be prepared by physically blending the different components. The blend is therefore a combination of polymer components that have already been formed and recovered before mixing or otherwise combined. The blending can also occur somewhat in solutions, miscible carriers, or by melt blending. The resulting blend is a multiphase polymer composition.

The balance of components in the blend is important because polypropylene and polyethylene will not maintain phase stability if the mix is not balanced. Instead, regions of polypropylene and polyethylene will form, which will affect the physical properties and stability of the finished article adversely. However, it has been found by maintaining the components in the range, for example, of from 50 to 80 wt % metallocene-catalyzed alpha-olefin polymer such as LLDPE; 20 to 50 wt % of the polypropylene component with the amount of LLDPE being the major component of the composition and comprising 50 wt % or greater of the polymer blend, a polymer blend is obtained which maintains phase stability and provides even improved mechanical properties and heat stability. The need for other components of the blend such as compatabilizers-polypropylene and polyethylene copolymers, are not needed. Thus, the polymer blend used in the present roofing membrane composition can consist of only the metallocene-catalyzed alpha-olefin polymer (such as LLDPE or VLDPE) and the random polypropylene copolymer. Cost efficiency and ease of operations are realized by the present blend, while still achieving improved performance characteristics.

Once the polymer blend has been achieved, the blend can be used to prepare a membrane for use in a roof. TPO roofing membranes are typically produced by a combination of twin screw extrusion and calendaring process. In the direct extrusion process, the components of the formulation are directly fed into an extruder so that melting, mixing, and extrusion can occur simultaneously. The twin screw extrusion lines provide high throughput combined with mixing capabilities of various ingredients. The extruded material is then calendared into wide sheet and winded into a finished roll. Generally, a membrane composition is prepared where certain additives and fillers are added to the polymer blend. In one embodiment, at least one flame retardant, at least one ultraviolet stabilizer and at least one pigment is added to the polymer blend. This prepares a membrane composition comprising from 40-80 wt % of the polymer blend, based on the weight of the entire membrane composition, with the remaining components comprising at least one flame retardant, an ultraviolet stabilizer and pigment. In one embodiment, a membrane composition comprising from 40-70 wt % polymer blend, based on the weight of the entire membrane composition, is prepared. The flame retardant can be present, in one embodiment, in an amount ranging from 10 to 40 wt %, and in another embodiment in an amount ranging from 25 to 40 wt %. A mixture of flame retardants can be used. The pigment can be present in an amount of 3-6 wt %, and in one embodiment, in an amount of about 5 wt %. The pigment often used is $TiO_2$. In one embodiment, a UV stabilizer can be present in the membrane composition in an amount ranging from about 2 to 7 wt %, and in one embodiment, in an amount of about 5 wt % of the membrane composition.

As noted above, the compositions described herein can also incorporate a variety of additives. The additives may include reinforcing and non-reinforcing fillers, antioxidants, stabilizers, processing oils, compatibilizing agents, lubricants (e.g., oleamide), antiblocking agents, antistatic agents, waxes, coupling agents for the fillers and/or pigment, pigments, flame retardants, antioxidants, and other processing aids known to the art. In some embodiments, the additives may comprise up to about 60 wt %, or up to about 55 wt %, or up to about 50 wt % of the roofing membrane composition. In some embodiments, the additives may comprise at least 25 wt %, or at least 30 wt %, or at least 35 wt %, or at least 40 wt % of the roofing membrane composition.

In some embodiments, the roofing membrane composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In some embodiments, the roofing composition may include flame retardants, such as calcium carbonate, inorganic clays containing water of hydration such as aluminum trihydroxides ("ATH") or magnesium hydroxide. Calcium carbonate and/or magnesium hydroxide are preferred as the flame retardants, which can be added directly to the composition, e.g., through the side feeder of the twin screw extruder. In another embodiment, for example, the calcium carbonate or magnesium hydroxide may be pre-blended into a masterbatch with a thermoplastic resin, such as polypropylene, a polypropylene/polyethylene copolymer, or a linear low-density polyethylene. For example, the flame retardant may be pre-blended with a polypropylene, where the masterbatch comprises at least 40 wt %, or at least 45 wt %, or at least 50 wt %, or at least 55 wt %, or at least 60 wt %, or at least 65 wt %, or at least 70 wt %, or at least 75 wt %, of flame retardant, based on the weight of the masterbatch. The flame retardant masterbatch may then form at least 5 wt %, or at least 10 wt %, or at least 15 wt %, or at least 20 wt %, or at least 25 wt %, of the roofing composition. In some embodiments, the roofing composition comprises from 5 wt % to 40 wt %, or from 10 wt % to 35 wt %, or from 15 wt % to 30 wt % flame retardant masterbatch, where desirable ranges may include ranges from any lower limit to any upper limit.

The presence of calcium carbonate together with the large amount of metallocene-catalyzed alpha-olefin polymer such as LLDPE or VLDPE has been found to be of particular advantage when the amount of calcium carbonate in the membrane composition is at least 25 wt %, for example 25 to 40 wt %. In one embodiment, the amount of calcium carbonate is at least 27 wt % of the membrane composition, for example from 27 to 40 wt %. The calcium carbonate can act as a flame retardant and/or a filler.

In some embodiments, the roofing membrane composition may include UV stabilizers, such as titanium dioxide or Tinuvin® XT-850. The UV stabilizers may be introduced into the roofing membrane composition as part of a masterbatch. For example, UV stabilizer may be pre-blended into a masterbatch with a thermoplastic resin, such as polypropylene or a polyethylene such as LLDPE. For example, the UV stabilizer may be pre-blended with a polypropylene, or an impact polypropylene-ethylene copolymer, or a linear low-density polyethylene, where the masterbatch comprises at least 5 wt %, or at least 7 wt %, or at least 10 wt %, or at least 12 wt %, or at least 15 wt %, up to 70 wt %, of UV stabilizer, based on the weight of the masterbatch. The UV stabilizer masterbatch may then form at least 2 wt %, or at least 7 wt %, or at least 10 wt %, or at least 15 wt %, of the roofing membrane composition. In some embodiments, the roofing composition comprises from 5 wt % to 30 wt %, or from 7 wt % to 25 wt %, or from 10 wt % to 20 wt % UV stabilizer masterbatch, where desirable ranges may include ranges from any lower limit to any upper limit.

Still other additives may include antioxidant and/or thermal stabilizers. In an exemplary embodiment, processing and/or field thermal stabilizers may include IRGANOX® B-225 and/or IRGANOX® 1010 available from BASF.

The compositions described herein are particularly useful for roofing applications, such as for thermoplastic polyolefin roofing membranes. Membranes produced from the compositions may exhibit a beneficial combination of properties, and in particular exhibit an improved balance of flexibility at temperatures across a wide range, along with stability at elevated temperatures such as those from 40° C. to 100° C. The roofing compositions described herein may be made either by pre-compounding or by in-situ compounding using polymer-manufacturing processes such as Banbury mixing or twin screw extrusion. The compositions may then be formed into roofing membranes. The roofing membranes may be particularly useful in commercial roofing applications, such as on flat, low-sloped, or steep-sloped substrates.

The roofing membranes may be fixed over the base roofing by any means known in the art such as via adhesive material, ballasted material, spot bonding, or mechanical spot fastening. For example, the membranes may be installed using mechanical fasteners and plates placed along the edge sheet and fastened through the membrane and into the roof decking. Adjoining sheets of the flexible membranes are overlapped, covering the fasteners and plates, and preferably joined together, for example with a hot air weld. The membrane may also be fully adhered or self-adhered to an insulation or deck material using an adhesive. Insulation is typically secured to the deck with mechanical fasteners and the flexible membrane is adhered to the insulation.

In one embodiment, the roofing membrane can comprise more than one layer. For example, the membrane can comprise a cap or top layer, and a core or lower layer. While the polymer composition of each of the layers is essentially the same, the additives may vary. The cap layer is directed to UV protection and therefore may contain a greater UV stabilizer concentration than the core layer. The core layer can be designed for more heat protection, and therefore contain more antioxidants than the cap layer. Each layer provides a separate focused function based on the additives present, but with the polymer composition being within that of the present blend so that the benefits of the present blend as described above can be realized.

The following Examples are provided to further illustrate certain embodiments but the Examples are not intended to be limiting.

Example 1

The various roofing membrane formulations below were prepared and tested for small-scale tensile and tear properties:

m-VLDPE/rPP (50/50): 31.75% m-VLDPE (Dow Affinity PLI 880), 31.75% rPP (Total rPP 7238), 27% CaCO$_3$, 5% heat and UV stabilizers, 4.5% TiO2 concentrate.

m-VLDPE/rPP (60/40): 38.5% m-VLDPE (Dow Affinity PL1880), 25% rPP (Total rPP 7238), 27% CaCO$_3$, 5% heat and UV stabilizers, 4.5% TiO$_2$ concentrate.

m-VLDPE/rPP (70/30): 44.5% m-VLDPE (Dow Affinity PL1880), 19% rPP (Total rPP 7238), 27% CaCO$_3$, 5% heat and UV stabilizers, 4.5% TiO$_2$ concentrate.

m-VLDPE/rPP (80/20): 50.8% m-VLDPE (Dow Affinity PL1880), 12.7% rPP (Total rPP 7238), 27% CaCO3, 5% heat and UV stabilizers, 4.5% TiO$_2$ concentrate.

All above formulations contain the same heat and UV stabilizer package, same CaCO$_3$, and same TiO$_2$ concentrate.

Figure 1B:
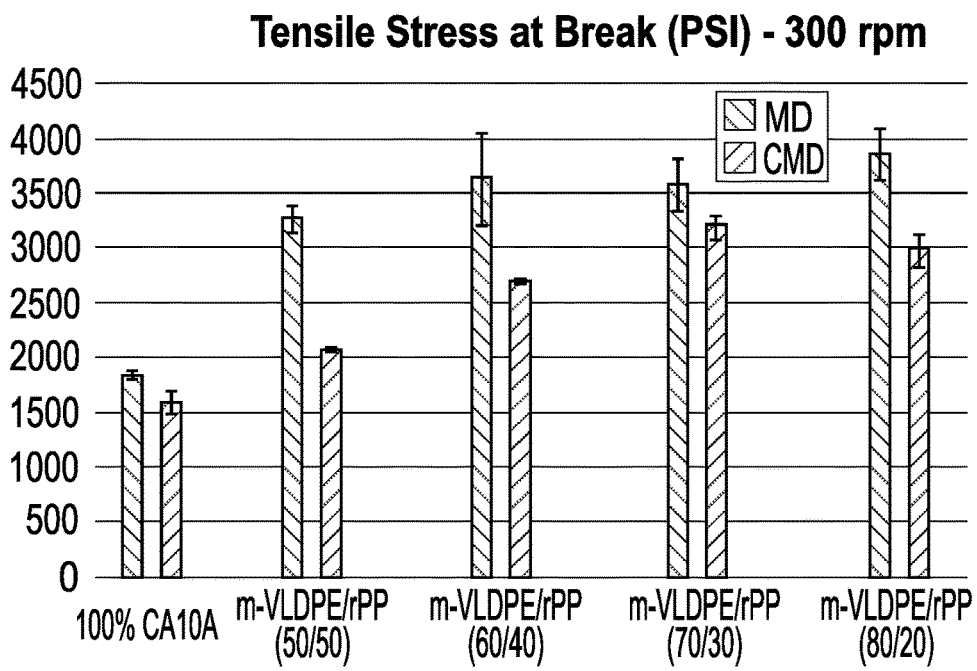
FIG. 1B graphically shows the tensile stress at break (PSI) properties of different roofing formulations comprising a metallocene-catalyzed VLDPE/random polypropylene roofing formulation.
Figure 1C:
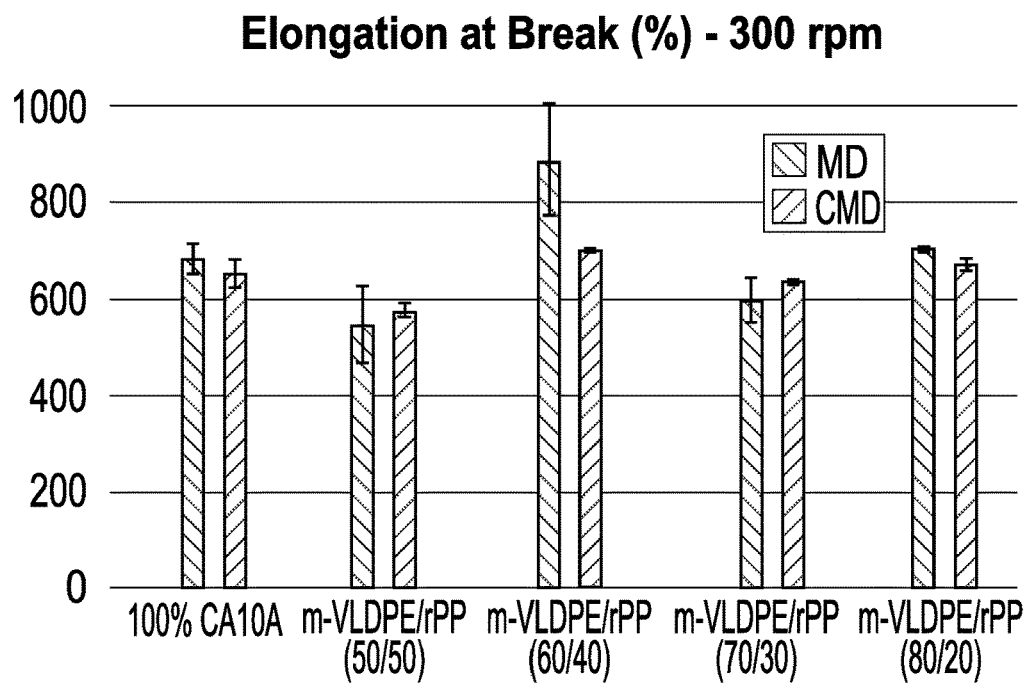
FIG. 1C graphically shows the tensile elongation at break (%) for different roofing formulations.
Figure 1D:
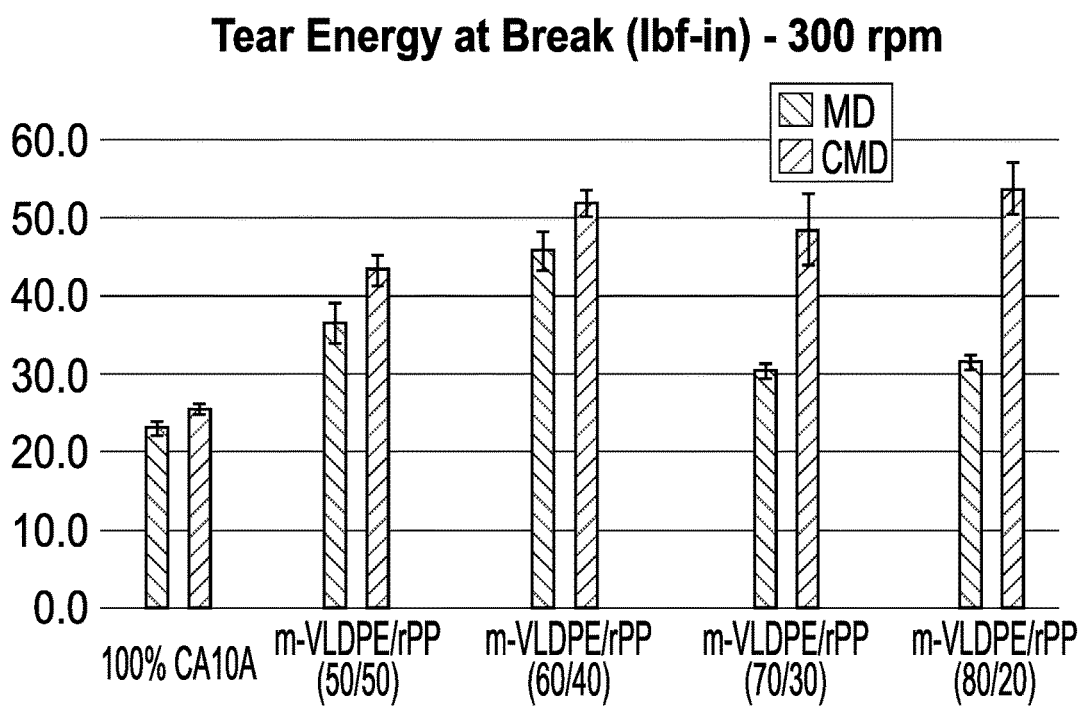
FIG. 1D graphically shows the tear energy at break (lbf-in) for different roofing formulations comprising a metallocene-catalyzed VLDPE/random polypropylene roofing formulation.

The results are graphically shown in FIGS. 1A-1D.

Example 2

The various metallocene-catalyzed LLDPE/random polypropylene roofing membrane formulations below were prepared and tested for small scale tensile and tear properties:

m-LLDPE/rPP (50/50): 31.75% m-LLDPE (Dow Innate TH60), 31.75% rPP (Total rPP 7238), 27% CaCO$_3$, 5% heat and UV stabilizers, 4.5% TiO$_2$ concentrate.

m-LLDPE/rPP (60/40): 38.5% m-LLDPE (Dow Innate TH60), 25% rPP (Total rPP 7238), 27% CaCO$_3$, 5% heat and UV stabilizers, 4.5% TiO$_2$ concentrate.

m-LLDPE/rPP (70/30): 44.5% m-LLDPE (Dow Innate TH60), 19% rPP (Total rPP 7238), 27% CaCO$_3$, 5% heat and UV stabilizers, 4.5% TiO$_2$ concentrate.

m-LLDPE/rPP (80/20): 50.8% m-LLDPE (Dow Innate TH60), 12.7% rPP (Total rPP 7238), 27% CaCO$_3$, 5% heat and UV stabilizers, 4.5% TiO$_2$ concentrate.

All above formulations contain the same heat and UV stabilizer package, same CaCO$_3$, and same TiO$_2$ concentrate.

Figure 2A:
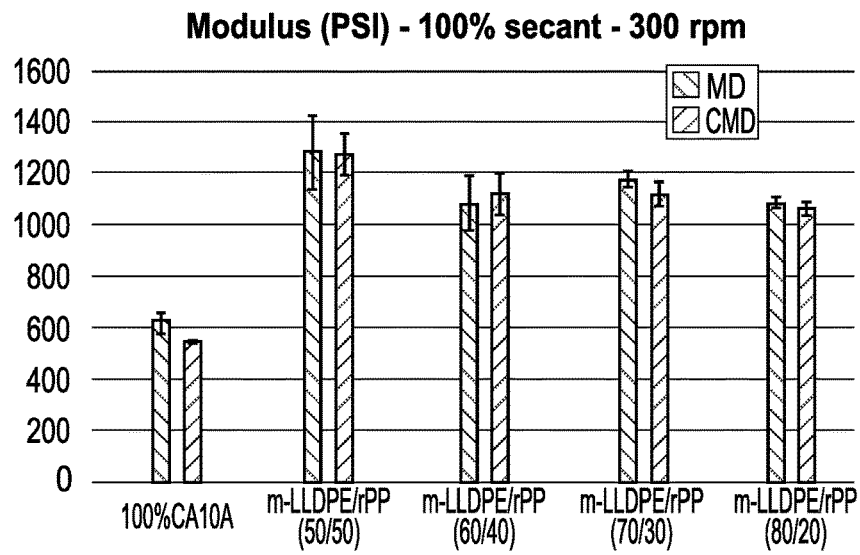
FIG. 2A. graphically shows the tensile modules (PSI) of different roofing formulations comprising a metallocene-catalyzed LLDPE/random polypropylene roofing formulation FIG. 2B. graphically shows the tensile stress at break (PSI) properties of different roofing formulations comprising a metallocene-catalyzed LLDPE/random polypropylene roofing formulation.
Figure 2B:
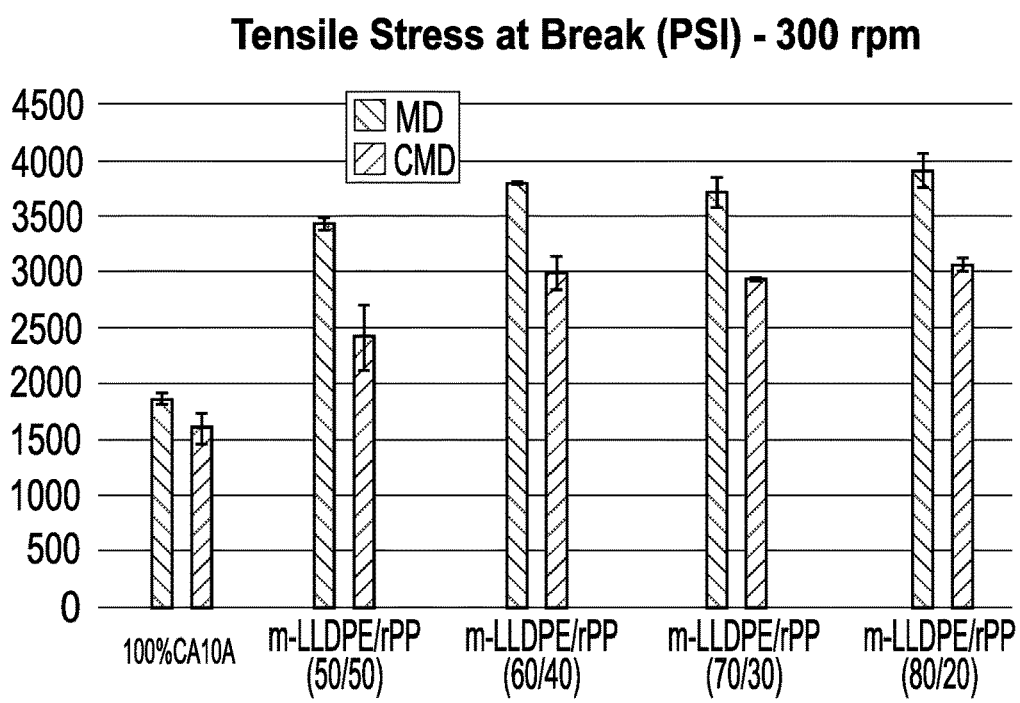
FIG. 2C graphically shows the tensile elongation at break (%) for different roofing formulations comprising a metallocene-catalyzed LLDPE/random polypropylene roofing formulation.
FIG. 2D graphically shows the tear energy at break (lbf-in) for different roofing formulations comprising a metallocene-catalyzed LLDPE/random polypropylene roofing formulation.
Figure 2C:
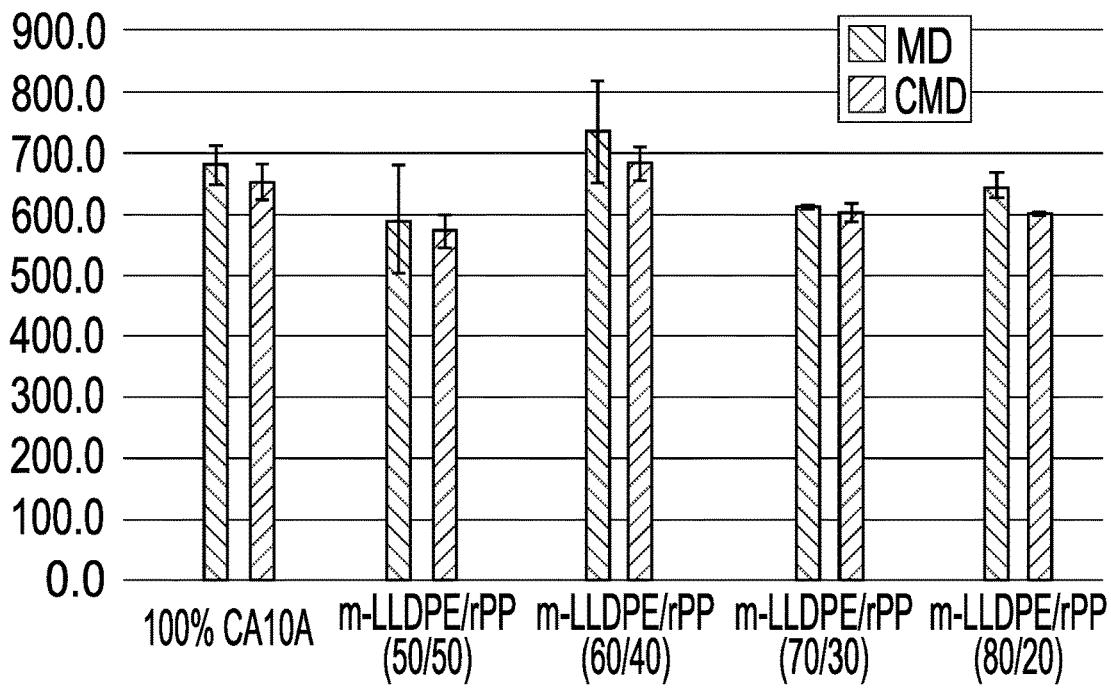
Figure 2D:
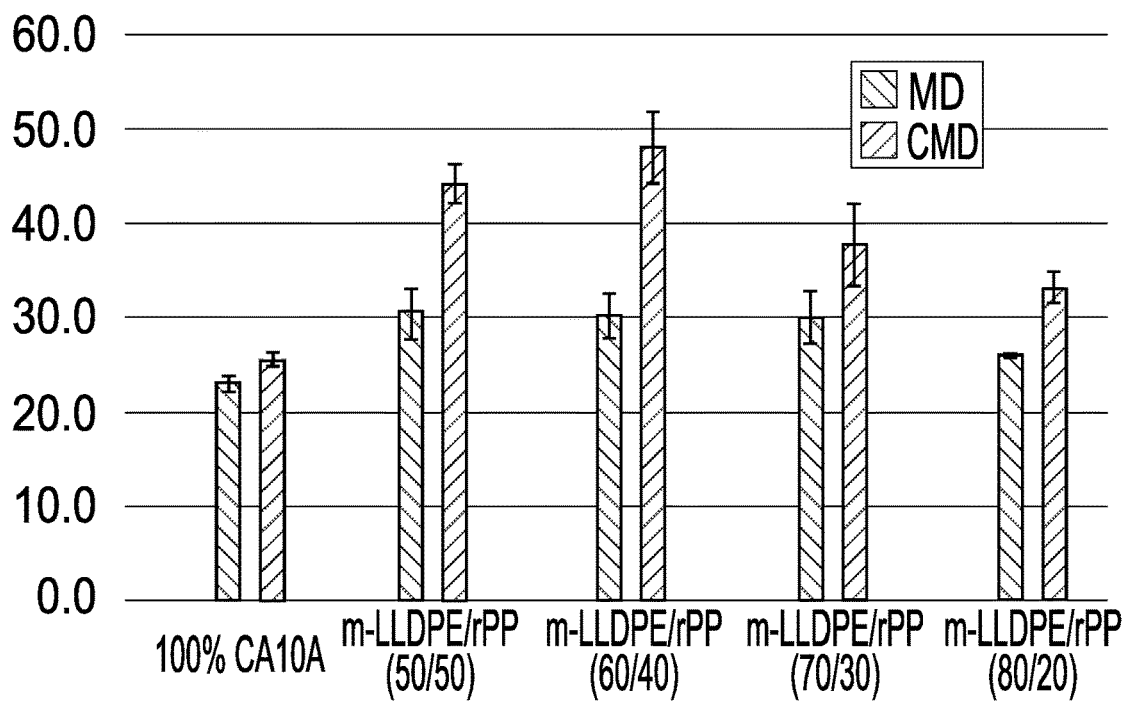

The results are graphically shown in FIGS. 2A-2D.

Example 3

Two roofing membrane polymer blend compositions were prepared and tested for various mechanical properties, and then compared to some prior roofing membrane polymer blends.

Case 1: In the specific case of using 60.6 wt % metallocene-catalyzed alpha-olefin polyethylene (Dow Affinity PL-1880) and 39.4 wt % rPP (Total rPP 7238), testing of the tensile properties in the machine direction indicated an elastic modulus of 1029±96 PSI (100% secant modulus), a tensile stress at break of 3634±426 PSI and an elongation at break of 882±112%. Testing of the tensile properties in the cross-machine direction indicated an elastic modulus of 942±87 PSI (100% secant modulus), a tensile stress at break of 2685±18 PSI and an elongation at break of 699±4%.

Testing of the tear properties (Die-C-tear) in the machine direction indicated a maximum stress of 1010±76 PSI and tear energy at break of 45.7±2.5 lbf-in. Testing of the tear properties (Die-C-tear) in the cross-machine direction indicated a maximum stress of 1201±68 PSI and tear energy at break of 51.8±1.8 lbf-in.

Case 2: In the specific case of using 60.6 wt % metallocene-catalyzed alpha-olefin polyethylene (Dow Innate TH60) and 39.4 wt % rPP (Total rPP 7238), testing of the tensile properties in the machine direction indicated an elastic modulus of 1075±112 PSI (100% secant modulus), a tensile stress at break of 3777±24 PSI and an elongation at break of 731±84%. Testing of the tensile properties in the cross-machine direction indicated an elastic modulus of 1112±84 PSI (100% secant modulus), a tensile stress at break of 2993±141 PSI and an elongation at break of 680±27%.

Testing of the tear properties (Die-C-tear) in the machine direction indicated a maximum stress of 1026±106 PSI and tear energy at break of 30.2±3.1 lbf-in. Testing of the tear properties (Die-C-tear) in the cross-machine direction indicated a maximum stress of 1190±69 PSI and tear energy at break of 48.0±3.8 lbf-in.

The results are shown in Table 2:

TABLE 2

| Property | Control | Metallocene-PE/rPP Case 1 | Metallocene-PE/rPP Case 2 |
|---|---|---|---|
| Tensile Elastic Modulus (100% secant), MD (PSI) | 617 ± 13 | 1029 ± 96 | 1075 ± 112 |
| Tensile Stress at Break, MD (PSI) | 1849 ± 65 | 3634 ± 426 | 3777 ± 24 |
| Tensile Elongation at Break, MD (%) | 675 ± 15 | 882 ± 112 | 731 ± 84 |
| Tear Energy at Break, Die-C-tear, MD (lbf-in) | 23.1 ± 2.4 | 45.7 ± 2.5 | 30.2 ± 3.1 |
| Tensile Elastic Modulus (100% secant), CMD (PSI) | 540 ± 11 | 942 ± 87 | 1112 ± 84 |
| Tensile Stress at Break, CMD (PSI) | 1604 ± 20 | 2685 ± 18 | 2993 ± 141 |
| Tensile Elongation at Break, CMD (%) | 646 ± 7 | 699 ± 4 | 680 ± 27 |
| Tear Energy at Break, Die-C-tear, CMD (lbf-in) | 25.5 ± 2.1 | 51.8 ± 1.8 | 48.0 ± 3.8 |

MD indicates "Machine Direction", while CMD indicates "Cross-Machine Direction" or "Transverse Direction".
The "Control" formulation is based on 63.5% CA10A, 27% CaCO$_3$, 5% heat and UV stabilizers, 4.5% TiO$_2$ concentrate.
The "Metallocene-PE/rPP Case 1" formulation is based on 38.5% m-VLDPE (Dow Affinity PL1880), 25% rPP (Total rPP 7238), 27% CaCO$_3$, 5% heat and UV stabilizers, 4.5% TiO$_2$ concentrate.
The "Metallocene-PE/rPP Case 2" formulation is based on 38.5% m-LLDPE (Dow Innate TH60), 25% rPP (Total rPP 7238), 27% CaCO$_3$, 5% heat and UV stabilizers, 4.5% TiO$_2$ concentrate.

When compared to polymer blend compositions described in U.S. Pat. Nos. 10,647,839B2 and 11,286,380B2, the present composition provides significant improvements in critical performance, in particular, better initial mechanical properties (tensile and tear). In both of the comparative compositions, a LLDPE was used which was not metallocene-catalyzed. Both of the comparative compositions also included compatibilizers, which were a propylene/ethylene copolymer having a polypropylene matrix and an ethylene/propylene copolymer with a polyethylene matrix.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A roofing membrane composition comprising:
    a) from 40 wt % to 70 wt % of a polymer blend composition consisting of:
        (i) from 50 to 80 wt % of a metallocene-catalyzed alpha-olefin polyethylene and
        (ii) from 20 to 50 wt % of a random polypropylene copolymer;
    b) at least one flame retardant;
    c) at least one ultraviolet stabilizer; and
    d) at least one pigment.

2. The roofing membrane composition of claim 1, wherein the polymer blend composition of a) comprises from 55 to 65 wt % of the roofing membrane composition.

3. The roofing membrane composition of claim 2, wherein the polymer blend composition of a) comprises from 60 to 64 wt % of the roofing membrane composition.

4. The roofing membrane composition of claim 2, wherein the polymer blend composition of a) comprises about 63.5 wt % of the roofing membrane composition.

5. The roofing membrane composition of claim 1, wherein the metallocene-catalyzed alpha-olefin polyethylene consists of from 57 to 65 wt % of the polymer blend composition in a).

6. The roofing membrane composition of claim 1, wherein the metallocene-catalyzed alpha-olefin polyethylene consists of from 59 to 61 wt % of the polymer blend composition in a).

7. The roofing membrane composition of claim 1, wherein the metallocene-catalyzed alpha-olefin polyethylene is a LLDPE.

8. The roofing membrane composition of claim 1, wherein the metallocene-catalyzed alpha-olefin polyethylene is a VLDPE.

9. The roofing membrane composition of claim 1, wherein the flame retardant comprises 10 to 40 wt % of the composition.

10. The roofing membrane composition of claim 9, wherein the flame retardant comprises 25 to 40 wt % of the composition.

11. The roofing membrane composition of claim 1, wherein the pigment comprises from 3 to 6 wt % of the composition.

12. The roofing membrane composition of claim 11, wherein the pigment comprises TiO$_2$.

13. The roofing membrane composition of claim 1, wherein the UV stabilizer comprises about 2 to 7 wt % of the composition.

14. The roofing membrane composition of claim 13, wherein the UV stabilizer comprises about 5 wt % of the composition.

15. The roofing membrane composition of claim 1, comprising calcium carbonate.

16. The roofing membrane composition of claim 1, wherein the flame retardant comprises calcium carbonate.

17. The roofing membrane composition of claim 16, wherein calcium carbonate comprises at least 27 wt % of the membrane composition.

18. The roofing membrane composition of claim 17, wherein the amount of calcium carbonate comprises at least about 30 wt % of the membrane composition.

19. The roofing membrane composition of claim 1, wherein the composition exhibits improved heat aging properties compared to a membrane composition comprising an in-reactor blend resin.

20. A roofing membrane comprising the membrane composition of claim 1.

21. A roof comprising a roofing membrane having a composition comprising:
a) from 40 wt % to 70 wt % of a polymer blend composition consisting of:
(iii) from 50 to 80 wt % of a metallocene-catalyzed alpha-olefin polyethylene and
(iv) from 20 to 50 wt % of a random polypropylene copolymer;
b) at least one flame retardant;
c) at least one ultraviolet stabilizer; and
d) at least one pigment.

22. The roof of claim 21, wherein the roofing membrane is fixed over base roofing by adhesive material, ballasted material, spot bonding, or mechanical spot fastening.

23. The roof of claim 22, wherein the roofing membranes have been installed by mechanical fasteners and plates placed along an edge sheet and fastened through the membrane and into roof decking.

24. The roof of claim 23, wherein adjoining sheets of roofing membrane are overlapped so as to cover the fasteners and plates and joined together by a hot air weld.

25. A method of preparing a roofing membrane, which comprises physically blending the components comprising:
a) from 40 wt % to 70 wt % of a polymer blend composition consisting of:
(v) from 50 to 80 wt % of a metallocene-catalyzed alpha-olefin polyethylene and
(vi) from 20 to 50 wt % of a random polypropylene copolymer;
b) at least one flame retardant;
c) at least one ultraviolet stabilizer; and
d) at least one pigment.

26. The method of claim 25, wherein the roofing membrane is produced by a combination of twin screw extensions as the physical blending followed by a calendaring process.

27. The method of claim 26, wherein the components are directly fed into an extruder such that melting, mixing, and extrusion occurs simultaneously, and then calendaring extruded material.

28. The process of claim 27, wherein the calendared extruded material is wound into a roll.

* * * * *